US012585710B2

(12) United States Patent
Sambhi et al.

(10) Patent No.: US 12,585,710 B2
(45) Date of Patent: Mar. 24, 2026

(54) PROCESS AND SYSTEM FOR DATA TRANSFERRING AND MAPPING BETWEEN DIFFERENT APPLICATIONS

(71) Applicant: HEYAUTOFILL, INC., San Francisco, CA (US)

(72) Inventors: Harpaul Sambhi, San Francisco, CA (US); Prashant Viswanathan, Toronto (CA)

(73) Assignee: HEYAUTOFILL, INC., San Francisco, CA (US)

( * ) Notice: Subject to any disclaimer, the term of this patent is extended or adjusted under 35 U.S.C. 154(b) by 0 days.

(21) Appl. No.: 17/328,554

(22) Filed: May 24, 2021

(65) Prior Publication Data

US 2022/0138270 A1 May 5, 2022

Related U.S. Application Data

(60) Provisional application No. 63/109,223, filed on Nov. 3, 2020.

(51) Int. Cl.
| | |
|---|---|
| *G06F 17/00* | (2019.01) |
| *G06F 16/93* | (2019.01) |
| *G06F 16/955* | (2019.01) |
| *G06F 40/134* | (2020.01) |
| *G06F 40/166* | (2020.01) |

(52) U.S. Cl.
CPC .......... *G06F 16/94* (2019.01); *G06F 16/9558* (2019.01); *G06F 40/134* (2020.01); *G06F 40/166* (2020.01)

(58) Field of Classification Search
CPC .... G06F 16/94; G06F 16/9558; G06F 40/134; G06F 40/166; G06F 40/186
See application file for complete search history.

(56) References Cited

U.S. PATENT DOCUMENTS

| | | | |
|---|---|---|---|
| 10,346,532 B2 | 7/2019 | Codrington et al. | |
| 10,789,418 B2 * | 9/2020 | Kutilek ................. | G06F 3/0482 |

(Continued)

FOREIGN PATENT DOCUMENTS

| | | | | |
|---|---|---|---|---|
| CN | 102473318 A | * | 5/2012 | ............. G06T 11/60 |
| CN | 105404506 A | | 3/2016 | |

(Continued)

OTHER PUBLICATIONS

Curtis, Eric, "The Paperless Classroom with Google Docs", 2013, Retrieved on Dec. 29, 2021 from http://www.rumson.k12.nj.us/rumson/Technology/Google%20 Docs%20Support%20Information%20Staff%20and%20Students/Copy%20of%20The% 20Paperless%20Classroom%20with%20Google%20Docs%20-%20Google%20Docs. pdf, pp. 1-14. (Year: 2013).*

(Continued)

*Primary Examiner* — Laurie A Ries

(74) *Attorney, Agent, or Firm* — Kutak Rock LLP

(57) ABSTRACT

A method and system for efficiently and automatically moving electronic data from a source, such as a website, to a sink, such as an electronic document; and building, training, and updating the system is provided. Generally, the method uses a system that employs a template for a source that contains labels associated with particular subject matter type of data, and a stitch or electronic link that associate the labeled data to a specific sink.

19 Claims, 5 Drawing Sheets

(56) References Cited

U.S. PATENT DOCUMENTS

| | | | | |
|---|---|---|---|---|
| 10,949,452 | B2 * | 3/2021 | Srinivasan | G06F 40/205 |
| 2005/0091269 | A1 * | 4/2005 | Gerber | G06F 9/44505 |
| 2005/0251742 | A1 * | 11/2005 | Mogilevsky | G06F 40/106 |
| | | | | 715/236 |
| 2006/0253418 | A1 * | 11/2006 | Charnock | G06F 16/38 |
| 2007/0277101 | A1 * | 11/2007 | Barber | G06F 40/166 |
| | | | | 715/764 |
| 2009/0192712 | A9 * | 7/2009 | Karami | E21B 43/20 |
| | | | | 702/6 |
| 2010/0332970 | A1 * | 12/2010 | Lee | G06F 40/18 |
| | | | | 707/822 |
| 2011/0252450 | A1 * | 10/2011 | Adrick | H04N 21/2221 |
| | | | | 725/62 |
| 2013/0019223 | A1 * | 1/2013 | Patrascu | G06F 9/4494 |
| | | | | 717/100 |
| 2013/0290837 | A1 * | 10/2013 | Hudetz | G06F 40/106 |
| | | | | 715/255 |
| 2014/0101571 | A1 * | 4/2014 | Lewis | H04L 67/1044 |
| | | | | 715/753 |
| 2015/0009359 | A1 * | 1/2015 | Zaheer | H04N 1/6077 |
| | | | | 348/239 |
| 2015/0309978 | A1 * | 10/2015 | Howell | G06F 40/169 |
| | | | | 715/230 |
| 2016/0239473 | A1 * | 8/2016 | Foyer | G06F 40/143 |
| 2017/0199657 | A1 * | 7/2017 | Mullins | G06F 3/0482 |
| 2017/0287090 | A1 * | 10/2017 | Hunn | H04L 63/12 |
| 2017/0315979 | A1 * | 11/2017 | Boucher | G06F 3/0482 |
| 2018/0143975 | A1 * | 5/2018 | Casal | G06F 40/51 |
| 2019/0179501 | A1 | 6/2019 | Seeley et al. | |
| 2019/0220539 | A1 * | 7/2019 | Taylor | G06F 11/3438 |
| 2020/0099763 | A1 * | 3/2020 | Goicochea | H04N 1/32144 |
| 2022/0107988 | A1 * | 4/2022 | Epstein | G06F 16/972 |
| 2022/0124135 | A1 * | 4/2022 | Wang | H04L 65/762 |

FOREIGN PATENT DOCUMENTS

| | | | | | |
|---|---|---|---|---|---|
| CN | 105190604 | B | * | 1/2018 | G06F 17/2288 |
| WO | WO-2004075466 | A2 | * | 9/2004 | G06F 16/24575 |
| WO | WO-2008102223 | A1 | * | 8/2008 | H04L 67/1095 |

OTHER PUBLICATIONS

"Curts, Eric. The Paperless Classroom with Google Docs. 2013. Retrieved on Dec. 29, 2021. Retrieved from the Internet: <URL:http://www.rumson.k12.nj.us/rumson/Technology/Google% 20Docs% 20Support%20Information%20for%20Staff%20and%20Students./ Copy%20of%20", The %20Paperiess%20Classroom%20with% 20Google%20Docs%20-20Google%20Docs.pdf>.

"International Search Report and Written Opinion for International Application No. PCT/US2021/057773, Search completed on Dec. 30, 2021, Mailed on Feb. 2, 2022."

* cited by examiner

FIGURE 2

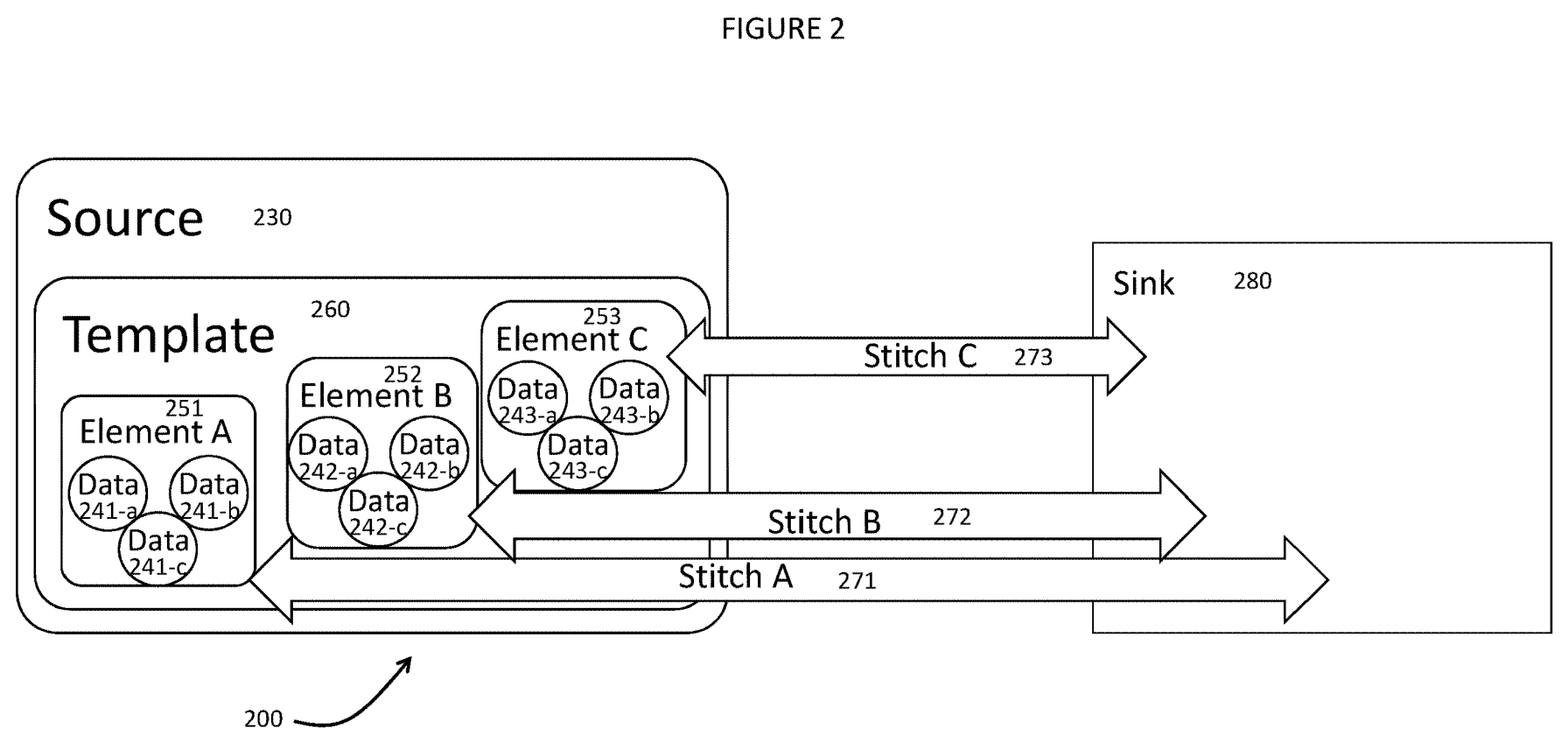

Source 230

Template 260

Element A 251
Data 241-a
Data 241-b
Data 241-c

Element B 252
Data 242-a
Data 242-b
Data 242-c

Element C 253
Data 243-a
Data 243-b
Data 243-c

Stitch A 271

Stitch B 272

Stitch C 273

Sink 280

Workflow
410

Element
420

Source
template
430

Stitching
450

Sharing
460

FIGURE 5

PROCESS AND SYSTEM FOR DATA TRANSFERRING AND MAPPING BETWEEN DIFFERENT APPLICATIONS

RELATED APPLICATIONS

This application claims priority to U.S. Provisional Patent Application No. 63/109,223 filed on Nov. 3, 2020, which is herein incorporated by reference in its entirety.

FIELD

This invention relates to software development. More particularly, this invention relates to understanding active applications, including both native and web applications, and the interlinking, and remembrance of data flow between systems.

BACKGROUND

Repetitive tasks are a great drawback for morale, creating high dissatisfaction and churn of a user performing the repetitive task. Current technological solutions require coding to develop a particular solution for each repetitive task, which severely limits the number of people, i.e., to competent coders who can automate a task. As a result, over 600 productive hours are lost annually per worker due to manual work involving repetitive tasks.

Routine repetitive tasks include copying and pasting. Copying information from a source, such as, e.g., a website, and pasting that information in a sink, such as, e.g., spreadsheet, document, form, electronic message, messaging or chat dialog box, social media input, and the like, is, by its very nature, transient and temporary. Presently, there is no product or process known to reduce task frequency and reduce the number of lost hours of productivity due to performing this repetitive task.

Disclosed are embodiments of a system and method for automating, simplifying, and/or reducing repetitive tasks, such as copying and pasting for a user.

SUMMARY

For some workflows, projects, and applications, repetitive copying and pasting can include underlying elements/variables that a user consistently looks for. Also, many workflows are similar among users across a company, industry and work function. As a result, templates containing certain of these underlying elements can be created and used in a relevant manner, helping to create productivity gains.

Furthermore, a link between element-related sources and sinks can be created. As used herein, such a link is referred to as a stitch. Some stitches (a group or class of stitches) are relevant to a group of users that often use the same source and sink. Those stitches—as well as templates—can be shared among those users, which also creates productivity gains.

In one aspect, the invention provides a method for automating the repetitive task of copying information from a source and pasting into a sink. Preferably, the method is performed on a computer given the complexity and large scale of processing and machine learning that is required. In some embodiments, the computer is any one or more of a number of technological devices, including a mobile/smart phone, tablet, and the like. In one embodiment, the method is not performed as a mental process, including a mental process that employs tools such as a pencil, paper, slide rule, and/or calculator.

In one embodiment, the method includes automatically creating one or more templates, each containing elements associated with a source. Each element is associated with one or more sinks in a process called stitching. In one embodiment, the method includes the step of creating one or more stitches (the step of stitching results in the creation of stitches). In still other embodiments, the templates and stitches are shared with others, such as other work nodes in a given workgroup, corporate entity or organization, and/or work function across multiple entities or workgroups within an organization.

In one embodiment, the template is formed by (a) examining and extracting network data, (b) identifying elements from the network data having high relevance to a particular user, and (c) selecting and including the relevant elements in the template. For example, a salesperson might routinely look at the number of employees at a company to determine if they should pursue a lead, whereas employee size (a subject matter category or element) is less relevant to a recruiter. In this example, the inference provides for the creation of a template for salespersons that includes elements pertaining to number of employees, whereas a template for recruiters may not include such an element.

In one embodiment, the source is inter alia a website, intranet site, document library, code, a software application like, e.g., SALESFORCE, MICROSOFT EXCEL, MICROSOFT WORD, and the like, an unstructured data source like, e.g., Outlook, and the like, and/or social media network such as, e.g., LinkedIn, and the like.

In one embodiment, the elements/variables are identified from the network data having high relevance to a particular user via machine learning by monitoring and identifying how various specific users are manually copying and pasting information, and then creating a relevant template for said specific users. In another embodiment, a user (e.g., a salesperson who works at IBM for illustration) can manually create a stitch, and also suggest labels (e.g., that this element is first name, last name, email for illustration) on the source page, such that the instant subject method or system then infers, based on the function of the user and/or company, that the stitch—and associated labels and/or elements/variables—may be useful to other users and/or companies. Here, the elements and associated stitch can be available to the second person within an entity (e.g., sales, IBM for illustration), or possibly with the same function (e.g., sales at another entity, e.g., Microsoft).

In one embodiment, stitches are created by surveying prior data across a network and identifying and selecting which source elements get tied to what sink elements. Here, data labels (e.g., the first name on a source) are inferred to a data label on the sink (e.g., name) and the two labeled elements are connected to form the stitch. In one embodiment, the user does not explicitly create the stitch.

In another aspect, the invention provides a system for linking information between two or more information sets. In one embodiment, the system includes an electronic information source, a template linked to the source, a stitch linked to the template, and a sink for the electronic information linked to the stitch. In one embodiment, the template includes elements, and the elements include electronic information or data categorized according to subject matter or other variables. In one embodiment, the system includes an application programming interface (API). In another embodiment, the system includes or accommodates any site or application accessible now or in the future on the internet. In another embodiment, the system includes or accommodates any site or application accessible by/on a computer, whether via the internet, intranet, local (e.g., such as Excel), or otherwise. Thus, in some embodiments, the instant system/method does not include, generate, or employ an API, and provides consuming and interpreting information.

In some embodiments, the system includes a listener program to track user data obtained from a source, a publisher program to transfer user data into a sink, a template service to create a template for the source, a data labeling service to assign user data to an element, a stitches service to link the template to the sink, a control interface for a user to use the system, template data associated with the template, stitches data associated the template-to-sink link, and user data containing source information used by the user.

DRAWINGS

FIG. 2 is a nested box graph depicting the interrelatedness of system components.

Figure 3:
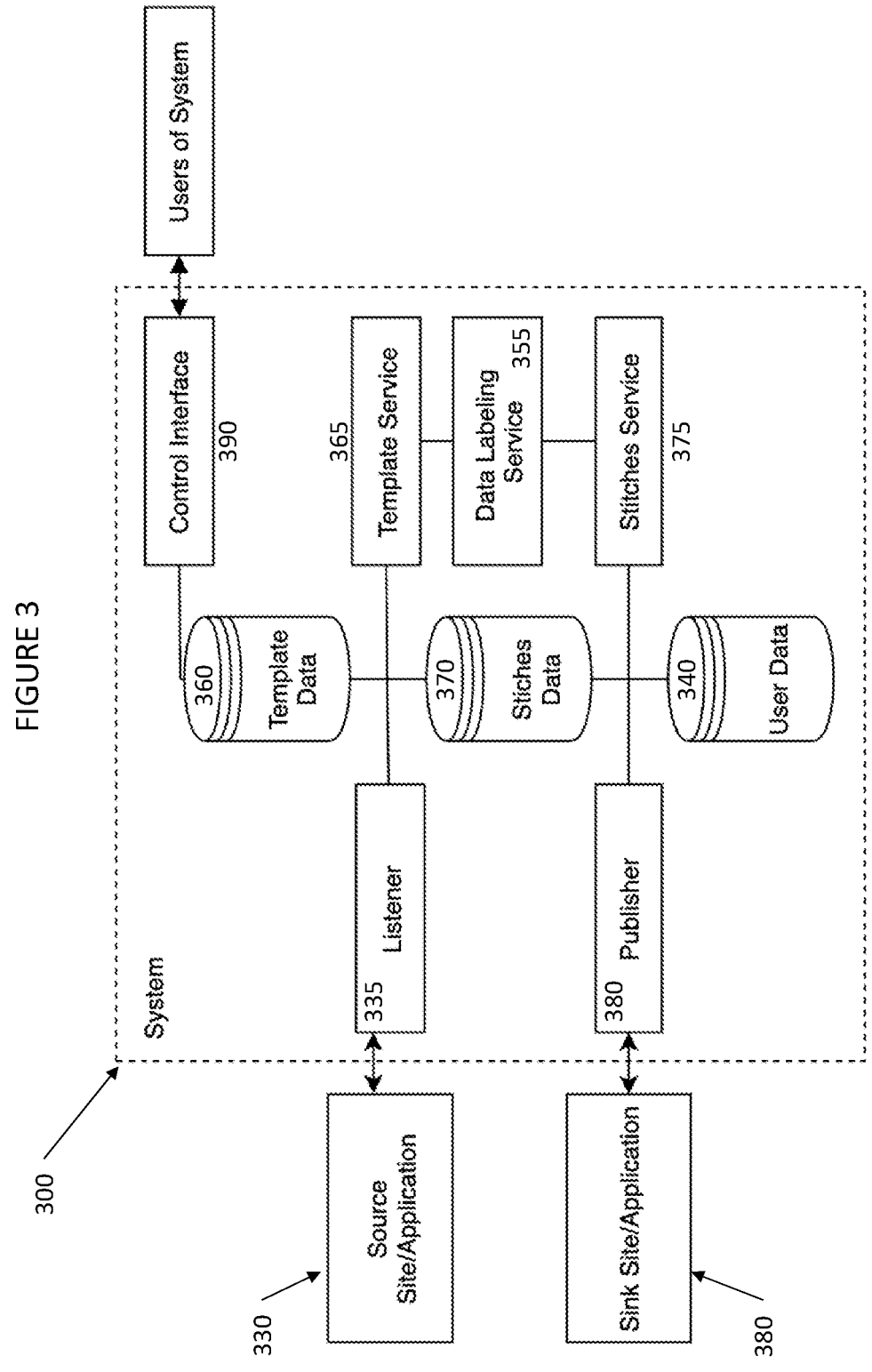

FIG. 3 is a nested box graph depicting the interrelatedness of system components. Cylinders depict data sets. Rectangles depict electronic software services or functions.

Figure 4:
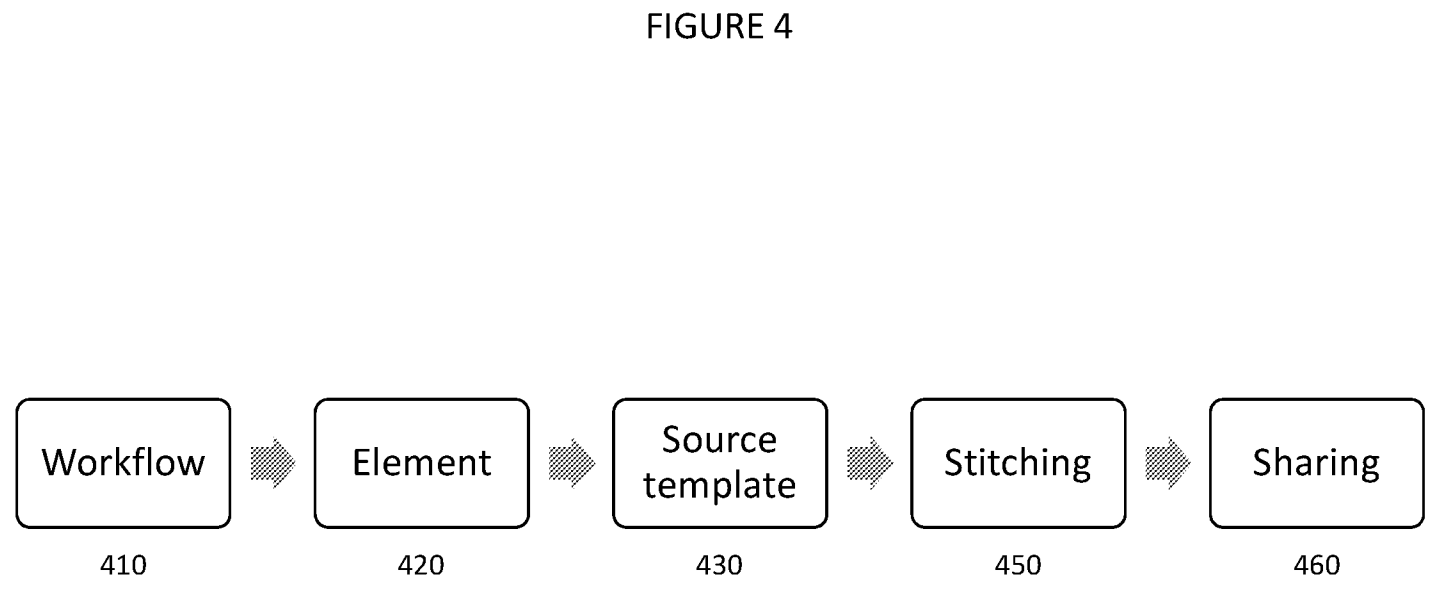

FIG. 4 is a flow chart depicting sequential process steps.

Figure 5:
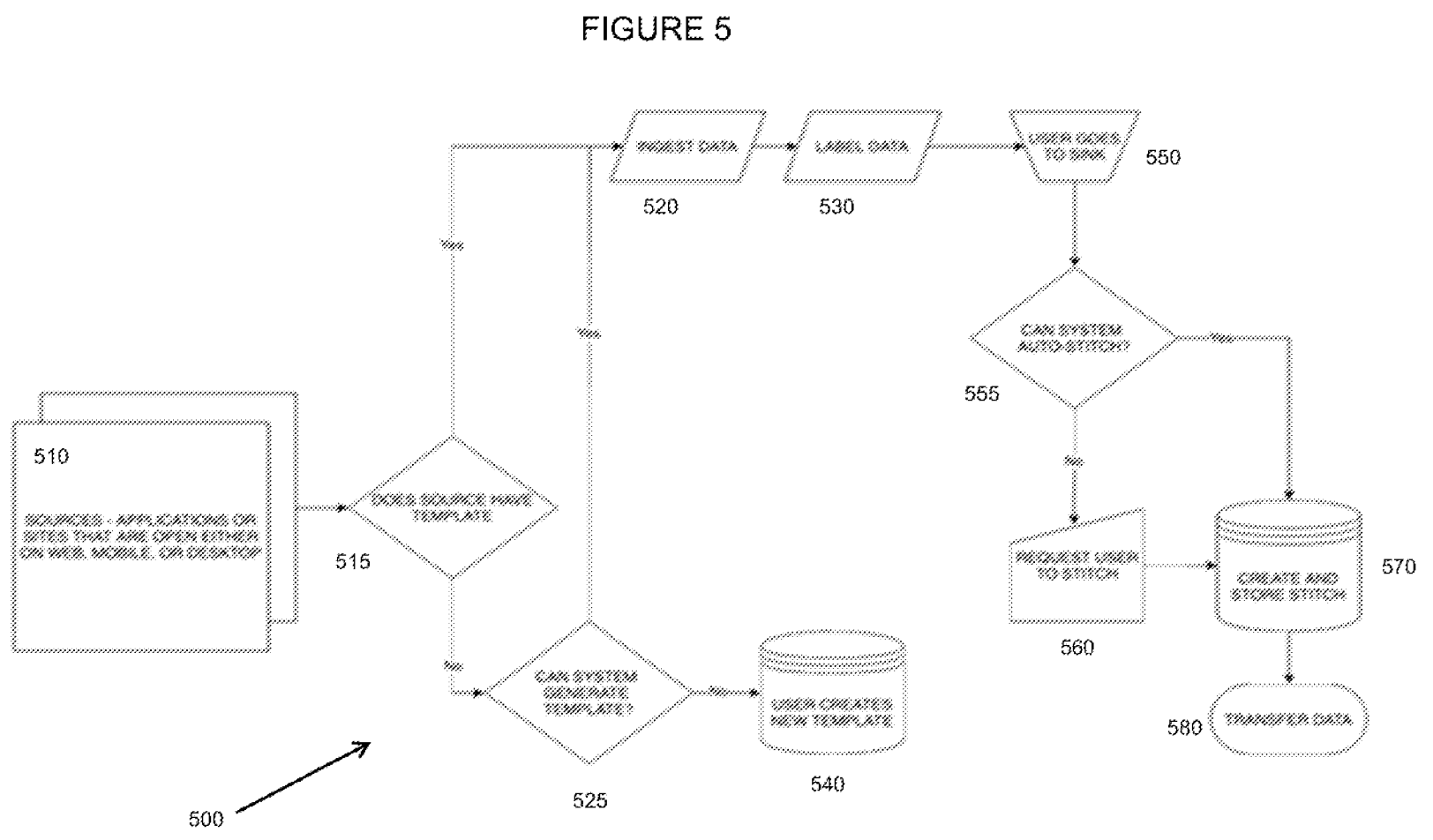

FIG. 5 is a logic flowchart depicting the steps, inputs, queries, and outputs of the system and method.

DETAILED DESCRIPTION OF EMBODIMENTS

Before the present methods are described, it is to be understood that this invention is not limited to particular methods or systems described, as such methods or systems may vary. It is also to be understood that the terminology used herein is for the purpose of describing particular embodiments only, and is not intended to be limiting, since the scope of the present invention will be limited only by the appended claims.

As used in this specification and the appended claims, the singular forms "a", "an", and "the" include plural references unless the context clearly dictates otherwise. Thus for example, a reference to "a method" includes one or more methods, elements, and/or steps of the type described herein and/or which will become apparent to those persons skilled in the art upon reading this disclosure and so forth.

Unless defined otherwise, all technical and scientific terms used herein have the same meaning as commonly understood by one of ordinary skill in the art to which this invention belongs. Although any systems, elements, methods and materials similar or equivalent to those described herein can be used in the practice or testing of the present invention, the preferred systems, elements, and methods and materials are now described. All publications mentioned herein are incorporated herein by reference to describe in their entirety.

The various embodiments of the system and method of the invention provide substantial advantages and improvements over current systems and methods for the repetitive copying and pasting of information from a source to a sink.

Many internet users, as well as non-internet "desktop" users, conduct repetitive tasks that are manual. For example, users copy and paste information from one web or native application, or website (also known herein as "source") and transfer this information to another web or native application, or website (also known herein as "sink"). This source and sink combination is made repeatedly in many workflows in myriad fields of endeavor and processes by myriad users, such as e.g., a recruiter, sales person, data entry position, IT professional, customer support person, or finance and accounting position.

In one embodiment, the invention provides a method or system for tracking and remembering the elements from the source that are copied repetitively, and making a linkage between the source and sink, thereby allowing the user to effortlessly move data between applications without the use of repetitive copying and pasting between applications. Work function, workflow, or source-specific templates containing source elements are created and employed (shared) by users in that or similar workflows to assist in the automated transfer of information from the source to the sink. Likewise, work function or workflow-specific stitches are created by linking a templated source to a sink and employed (and shared) by users in that or similar workflows to assist in the automated transfer of information from the source to the sink.

In some embodiments, the method or system works by creating templates of a source, either programmatically using software operating on a central processing unit, and/or by allowing users to create a template based upon their individual workflow experience and needs. In one embodiment, a template is a collection of elements that a user continually copies and pastes into another application. In one embodiment, an element is the underlying data variable that a web or native application defines, thereby displaying the data or information associated with that data variable to the user. The user continually retrieves the same elements in the execution of the work, even though the content of the element (underlying associated information) changes. For example, a user, who is focused on the particular element of "revenue", will continually retrieve that element and its associated content information, even though the content information associated with the element "revenue" changes over time.

In some embodiments, a machine program links a templated source (source with one or more associated templates) to a sink to create a stitch (i.e., stitching or creating a stitch). In some embodiments, a user creates a stitch. The creation of a stitch or the stitch itself enables the subject system or process to remember what element or class of element should be linked between the source and sink. In some embodiments, the stitch, or plurality of specific stitches, are retained in the subject system, and are available for the user to quickly retrieve the next time they transfer data between systems.

Given that workflows are similar between users within a company, industry, or function, in some embodiments these templates are automatically propagated to other users within the network, and stitches are shared among teams of users that work within the same company and/or project. This creates an immediate efficiency gain.

In some embodiments, the elements, stitches, sources, sinks, etc. of the system are automatically updated or refreshed (auto-updating). Here, in one aspect, a system program checks if the original copy data has changed, and if so, auto-updates all the pastes. For example (and for illustration purposes), (a) user (1) goes on the SALES-FORCE customer relationship management service and suite of enterprise applications focused on customer service, marketing automation, analytics, and application development, (2) copies revenue for the quarter, (3) pastes it in Excel in 4 different files, then (4) pastes it in POWERPOINT, and then (5) pastes it in a wiki; (b) the data changes and a later time/place; (c) the system notifies user that the data has changed; and (d) the system instructs user to update the element information/target information/copied information/ stitch, the system auto-updates, or the user toggles a radio button or the functional equivalent thereof to effect the auto-update.

In some embodiments, the system or method employs a listener program to track changes in the user data obtained from a source. Here, in one embodiment, a publisher program is employed to overwrite the original data. Here also in one embodiment, the system or method notifies or alerts the user of a change and queries whether the user is interested in auto-updating such sinks.

In other embodiments, the system or method provides metadata to the source/stitch/sink once the source and the sink have been identified and the stitch has been created in order to help automate the execution of a repetitive task. Here, in one embodiment, metadata includes information on when the user will likely do this repetitive task. For example and illustration, the user always/frequently copies this type of data on Monday morning or the like, or when the user opens the source and sink pages, therefore here is a high likelihood that the user will do the repetitive task at that time/place/action. Here the, the system can start doing the repetitive task for the user at that time/place/action.

Figure 1:
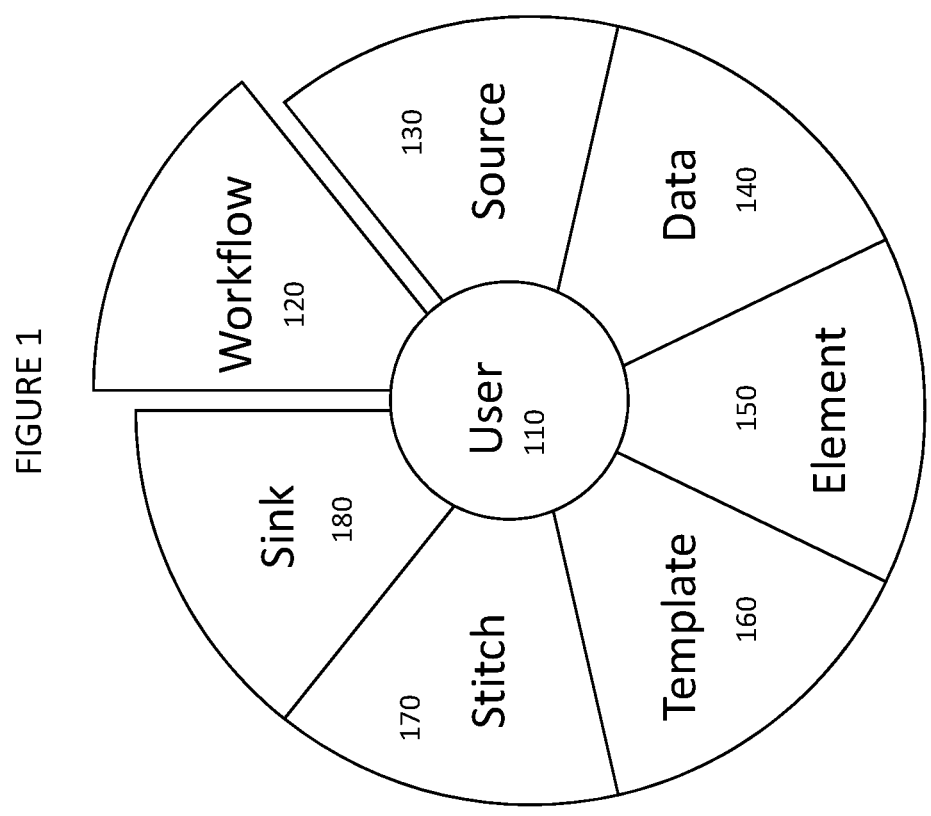
FIG. 1 is a pie graph depicting system components.

Turning to FIG. 1, in one embodiment, the invention provides an automated system 100 for transferring information from a source 120 to a sink 170. Here, the source 120 may be any electronic medium source of information, such as a website, intranet site, textual or graphical document, and the like, from which certain amounts of data or information 130 (e.g., text, graphics, metadata, hyperlink address, and the like) are electronically copied for transfer to a sink 170.

In one embodiment, the system 100 contains a user 110, a workflow 120 that is performed by the user, a source 130 of electronic information, data or information 140, one or more elements 150 that contain a certain class data or information, a template 160 that contains elements associated with a given source, a stitch 170 that links an element and its underlying data to a particular sink 180, and a sink 180, such as an electronic document that is created by or used by the user, that the data or information 140 is pasted into.

In some embodiments, the user is a human being. In other embodiments, the user is a group of human beings. In other embodiments, the user is a machine or artificial intelligence.

In some embodiments, the workflow includes any sequence of industrial, administrative, or other work processes through which a piece of work passes from initiation to completion. As used herein, the term workflow refers to any sequence of industrial, administrative, or other processes through which a piece of work passes from initiation to completion within a particular field or endeavor. For example, and for illustration purposes, a workflow can be inter alia a human resources recruitment workflow, a financial advisory workflow, a practice of law workflow, an engineering workflow, an office administration workflow, a project management workflow, and the like.

In some embodiments, the source is any electronic medium that contains data or information that can be copied, or selected and copied into an electronic medium or electronic clipboard for later retrieval and/or pasting into another electronic medium (i.e., herein referred to as sink). Examples of sources include websites, webpages, website content, internet and intranet content, intranet sites, electronic text documents such as Microsoft word documents, electronic portable documents such as PDFs, electronic spreadsheets, electronic presentation documents such as PowerPoint documents, text documents created using hypertext markup language, email, messaging services like Slack, etc., images that can be created in Adobe, Figma, etc., generic files, and the like. In some embodiments, the source is preferably a website, an intranet site, and/or the respective content thereof.

In some embodiments, the data (a term which is used herein interchangeably with information) is electronic data that can be selected and copied onto an electronic clipboard or other electronic memory system or buffer for short-term storage and transfer within and between application programs. What constitutes as data is any electronic material that can be saved in a paste buffer. Examples of data include electronic text, pictures, graphs, tables, equations, hypertext, hyperlinks, metadata, captions, and the like. Here, the data is initially located in the source.

In some embodiments, an element is a bucket, group, or class of subject-matter related data. An element has a label or other identifier that identifies the element and enables the user to know with some level of particularity the kind of data associated with the element. Since an element comprises related subject-matter data, the specific data contained within any given element can change from source-to-source and from time-to-time, but the subject matter type remains essentially constant. For example, and for illustration purposes, an element may be labeled as or directed to subject matter related to airfoil shapes and size, market value of publicly traded companies, headcount of business entities, or the like. In this example, the element of market value of publicly traded companies includes data that changes over time, such as when new companies become publicly traded, public companies become private, and stock values change for companies. Here, the data may change, but the element itself remains relatively stable.

In some embodiments, the template contains one or more elements grouped together and associated with a source. Here, the template is applied to a source for one or more workflow. In some embodiments, the template itself contains metadata associated with the grouping of elements and subject data. In some embodiments, the template contains one or more stitches and/or data or metadata associated with the stitch(es). Templates can be made by a human user or a machine user for use by the user. Templates are generally associated with a source, and in some embodiments may be shared between sources and/or generally available in a library for use by multiple users across multiple sources and/or workflows.

In some embodiments, a stitch contains information that links a template, an element, and/or data within an element to a sink. Preferably, the stitch is or contains a link between an element and a sink as defined by a machine user or a human user. In some cases, the stitch may link the template/ element/data to a group of functionally related sinks as defined by the machine user or a human user. Stitches may be shared between sources and/or generally available in a library for use by multiple users across multiple sources and/or workflows.

In some embodiments, the sink 180 is any electronic document, file, or shared resource to which data 140 can be pasted. Preferred sinks include electronic documents generated in a workflow, such as a text file, spreadsheet, presentation, or website/WordPress-like document. Here, the sink 180 is associated with a source 130 by way of a stitch 170.

Turning to FIG. 2, the invention provides a system 200 for the improved selection, collection, and organization of electronic information, preferably in the performance of a workflow. FIG. 2 graphically represents one embodiment showing the interrelation between a set of representative components of the system. In one embodiment, a source 230 of electronic information (e.g, a website or the like) is linked to or otherwise associated with one or more templates 260. In another embodiment, one or more templates are associated or linked to one or more sources 230. A source with one or more associated templates is a templated source. In some embodiments, a template is used within or assigned to a particular workflow. Multiple workflows may use the same source.

As discussed above, each template 260 contains one or more elements 251-253 that compile, collect, and/or label data 241-243 that relates to the element or fits under the umbrella of the element 251-253. In some embodiments, different workflows employ templates 260 containing elements 251-253 containing subject matter according the particular nature of the workflow. Here, multiple different templates may be applied to the same source depending on the nature of the workflow. Templates 260 can be made available in an electronic library or database and accessed by multiple users for various workflows.

In some embodiments, each element 241-243 within a template, or the entire template 260 itself is electronically linked to or otherwise associated with the sink 280 by way of a stitch 271-273. Here, a specific stitch (e.g., 271, 272, or 273) binds a specific element (e.g., 251, 252, or 253, respectively) to a sink 280.

Turning to FIG. 3, the invention provides an electronic data exchange system 300 that enables or facilitates the movement of electronic information between a source 330 and a sink 380. The use by a user of the system 300 is mediated or controlled through a control interface 390 that interfaces with the user. Here, the user can be an individual, a coordinated group of individuals, or a machine. In one embodiment, the system 300 employs a listener 335 to track, monitor, and/or record the copying of electronic data from the source 330. In some embodiments, the source 330 is a website (or mobile site), an application, or the like. A processor assigns a profile to the electronic data to a create user data 340. An electronic data labeling service 355 assigns a label or umbrella category to the various user data to create one or more elements (as herein described, e.g., 150, 251-253). Elements associated with particular sources and/or workflow functions are compiled by an electronic template service 365 into templates that contain template data 360. Template data 360, which is compiled or created by the template service 365, contains any one or more of the electronic data, user data, labeled data, and any element-associated and/or template/source-associated metadata.

In one embodiment, the system 300 employs an electronic stitches service 370 to link templates data 360 (or element-organized data or elements) to the sink 380. Data, including meta-data, associated with the stitching instructions or maps and the stitched templates data constitutes the stitches data 370 or stitches. In one embodiment, an electronic publisher 385 conveys or delivers associated stitches data information to the sink 380. In some embodiments, the sink 380 is a website (or mobile site), an application, or the like.

Turning to FIG. 4, in one embodiment, the invention provides an improved method for moving electronic information from a source to a sink. The method employs a software-enabled machine system, as disclosed herein, that is developed according to the following general process.

In one embodiment, a workflow 410 comprising copying and pasting electronic material (i.e., data) from a source to a sink is performed by a user. The workflow is tracked and mapped by the machine using a listener. The machine assigns each batch of data to a common group under a subject matter heading and labels it using a data labeling service to form an element 420, i.e., the machine labels the data, and the label represents or identifies the element 420. The machine continues to learn via machine learning or artificial intelligence to associate specific and heretofore unlabeled subject matter data from a source to a specific element.

Elements and their associated data are compiled or collated by the machine into a template 430 associated with a source. The machine then links or stitches 440 each element (and its constituting and continuously learned and categorized data) to a target sink using a stitching service. In some embodiments, a user trains the machine to stitch. The machine continues to learn to stitch particular elements to particular sinks to create stitches. In some embodiments, any one or more of the elements, templates, and stitches are shared 450 with other users performing the same or similar workflow. In some embodiments, any one or more of the elements, templates, and stitches are shared 450 through an electronic library or database.

In some embodiments, a machine-enabled system for automating the copying and pasting of electronic material is built using the system and process 500 depicted in FIG. 5. Here, a machine or user asks 515 whether the source 510 has a template. If the answer to the query 515 is yes, then the machine program ingests 520 the data presented in the source and then labels 530 the data (i.e., places the data into an element category). If the answer to the query 515 is no, then the machine or user asks 525 whether the system can generate a template for the source. If the answer to the query 525 is yes, then the machine program ingests 520 the data presented in the source and then labels 530 the data. If the answer to the query 525 is no, then the user creates 540 a new template for the source.

Next, the user goes 550 to the sink and the use or the machine asks 555 whether the system can automatically create a stitch. If the answer to the query 555 is yes, then the machine creates and stores 570 a stitch. If the answer to the query 555 is no, then the system requests the user to create 560 the stitch, and then the user creates and stores 570 a stitch. Once the stitch is created, the data is transferred 580 to the sink.

In one embodiment, a user employs any one or more of the embodiments of the disclosed system while operating a workflow. Here, the subject system automates the process of copying and pasting by employing workflow specific templates and stitches to move electronic material from the source to the sink, thereby relieving the user of the repetitive, error-prone, and productivity-sapping task of copying and pasting electronic data.

The invention claimed is:

1. A system for linking information between two or more unrelated information sets, the system comprising:
   a source;
   a template linked to the source, said template comprising
      a plurality of source elements, wherein each source element comprises relevant source information which continually changes;
   a listener element configured to track the change in relevant source information and create an alert upon a change;
   a publisher element;
   at least one stitch linked to the template; and
   a sink linked to the stitch, said sink comprising a plurality of sink elements;

wherein said source and sink are unrelated applications;

wherein each source element is tied with a corresponding sink element to create a stitch;

wherein said publisher element is configured to allow for repeatable transfer of said plurality of source elements to said sink, and is further configured to overwrite old data upon transfer.

2. The system of claim 1, wherein the source elements comprise user data.

3. The system of claim 1 further comprising:

a listener program to track user data obtained from a source;

a publisher program to transfer user data into a sink;

a template service to create a template for a source;

a data labeling service to assign user data to an element;

a stitches service to link the template to the sink;

a control interface for a user to use the system;

template data associated with the template;

stitches data associated the template-to-sink link; and user data comprising source information used by the user.

4. The system of claim 3 further comprising an auto-update feature.

5. The system of claim 4, wherein the auto-update feature employs the listener program to track changes and employs the publisher program to update pastes.

6. The system of claim 5, wherein the auto-update feature queries the user whether to make a change or to auto-update a paste.

7. The system of claim 3 further comprising metadata associated with the stitches data.

8. The system of claim 7, wherein the metadata comprises information regarding time, user activity, type of action, and frequency of action associated with the stitches data.

9. The system of claim 1, wherein the source is a website or software application, wherein said software application comprises internet and non-internet based applications.

10. The system of claim 1, wherein the sink is a software application or an electronic document.

11. The system of claim 1, wherein the user is a machine, an individual, or a group of individuals.

12. A method of linking information between two or more unrelated systems, the method comprising:

a user providing a source containing electronic information;

the user providing a sink for the electronic information;

a machine applying to the source a software system that comprises a template and a stitch, each stich being created by identifying and tying electronic information from said source with the corresponding electronic information from said sink;

the machine publishing the electronic material to the sink;

the machine listening and tracking said source and providing an alert when said electronic information changes; and the machine overwriting corresponding electronic information from said sink with new electronic information upon a change in electronic information in the source, wherein said source and said sink are unrelated applications; and wherein said template comprises a plurality of source elements and each source element comprises relevant electronic information which continually changes.

13. The method of claim 12 further comprising:

providing a source of electronic information;

compiling the electronic information into subject matter categories to form one or more elements;

compiling the one or more elements into a template that is specific to the source;

linking the one or more elements to a sink to create one or more stitches; and transferring the electronic information to the sink.

14. The method of claim 13 further comprising storing the template in a library.

15. The method of claim 13 further comprising storing the one or more elements in a library.

16. The method of any one of claim 13 further comprising storing the one or more stitches in a library.

17. The method of claim 12, wherein the source is a website or software application, wherein said software application comprises internet and non-internet based applications.

18. The method of claim 12, wherein the sink is a software application or an electronic document.

19. The method of claim 12, wherein the user is a machine, an individual, or a group of individuals.

* * * * *